Feb. 19, 1957

D. R. YOUNG
PIEZOELECTRIC INTERROGATION
OF FERROELECTRIC CONDENSERS
Filed Oct. 1, 1953

2,782,397

INVENTOR.
DONALD R. YOUNG
BY William V. Schelberg
AGENT

United States Patent Office 2,782,397

Patented Feb. 19, 1957

2,782,397

PIEZOELECTRIC INTERROGATION OF FERROELECTRIC CONDENSERS

Donald R. Young, Poughkeepsie, N. Y., assignor to International Business Machines Corporation, New York, N. Y., a corporation of New York Application October 1, 1953, Serial No. 383,537

9 Claims. (Cl. 340—173)

Figure 1A:
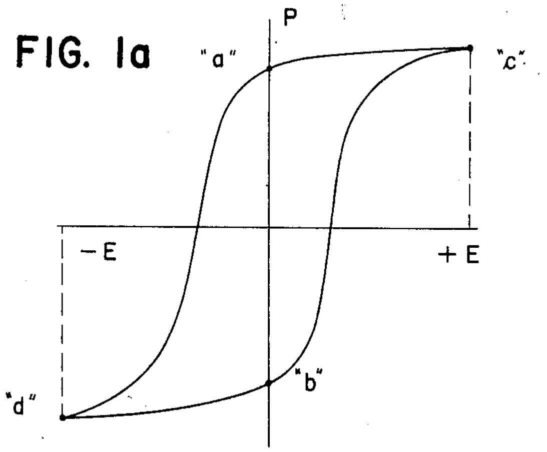

This invention relates to the employment of ferroelectric capacitors for the storage of binary digits and is directed in particular to an arrangement for determining in a non-destructive manner which one of two representations have been stored in such an element.

Ferroelectric capacitors comprise dielectric materials which depend upon internal polarization rather than upon surface charge for storage of information and a number of such materials are known such as barium titanate, Rochelle salt and potassium niobate, for example. These materials may be prepared in the form of single crystals or ceramics upon which conductive coatings may be evaporated to provide terminals. Ferroelectric capacitors exhibit two stable states of polarization somewhat similar to the stable remanence states of magnetic materials when subjected to electric fields of opposite polarity and as a consequence, are readily adapted for use as binary storage elements. A further characteristic of such devices is the piezoelectric property or characteristic of changing dimensions in response to potentials applied across the terminals and conversely, to produce a voltage differential between the terminals in response to mechanical pressures exerted between the faces of the crystal or ceramic. It is to this latter property that the present invention is particularly related and primarily involves producing a change in the dimensions of one ferroelectric element by application of potentials, which dimension change operates on a second ferroelectric element to cause the latter to exhibit a characteristic potential across its terminals, which potential is demonstrative of the state of polarization or binary digit stored by the latter.

It is accordingly an object of the invention to provide a novel means for determining the polarization state of a ferroelectric capacitor in response to the piezoelectric action of another ferroelectric element.

Another object of the invention is to provide a method of reading stored information from ferroelectric capacitors in a non-destructive manner.

Other objects of the invention will be pointed out in the following description and claims and illustrated in the accompanying drawings, which disclose, by way of example, the principle of the invention and the best mode, which has been contemplated, of applying that principle.

In the drawings:

Figure 1*a* is a diagrammatic representation of the hysteresis curve for a ferroelectric capacitor such as that employed in the system illustrated and described.

Figure 1B:
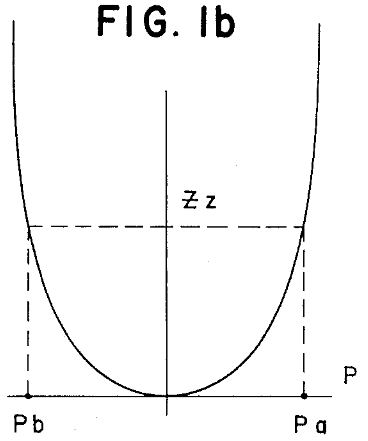

Figure 1*b* is a curve illustrating the electromechanical behavior of a barium titanate crystal.

Figure 2:
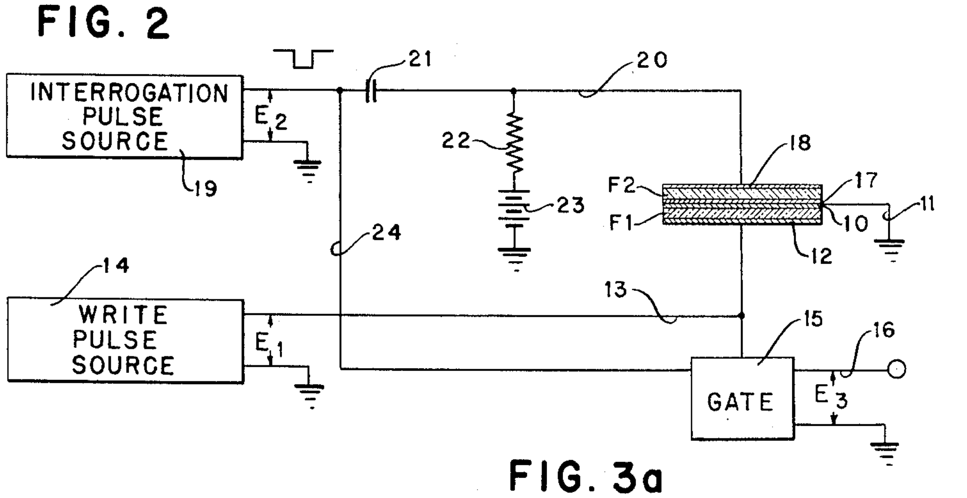

Figure 2 is a schematic diagram of the circuit arrangement for piezoelectric reading of a ferroelectric storage capacitor.

Figure 3A:
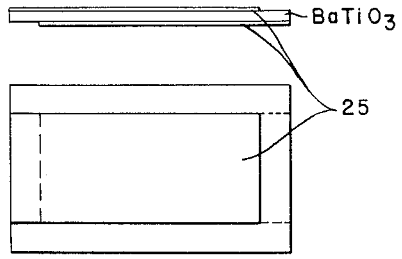
Figure 3B:
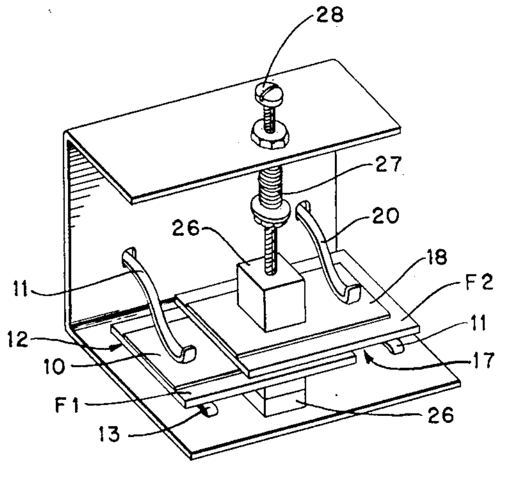

Figures 3*a* and 3*b* illustrate mechanical features of the ferroelectrics and the apparatus employed for mounting them in contact with one another and under pressure.

Materials having somewhat rectangular hysteresis loops and low coercive force are desired in ferroelectric capacitors employed in memory systems. The hysteresis characteristic for a barium titanate crystal of this type is illustrated in Figure 1*a* where the vertical axis represents the electrical displacement or degree of polarization P, and the horizontal axis represents the applied electric field E which is proportional to the voltage presented to the terminals of the capacitor.

When polarized in either one or the other directions by an electric field, the ferroelectric capacitor will remain in either one or the other stable polarization states *a* or *b* when the field is removed. In storing binary information, the residual state of polarization designed *b* is arbitrarily selected as representing a binary "zero" and residual state *a* then represents a binary "one." With the capacitor existing in state *b*, application of a positive potential or positive electric field to one of the terminals causes the hysteresis loop to be traversed from point *b* to point *c*, which is the saturation state, and, on removal of the applied electric field, returns to a point *a* at which state it remains representing a stored "one." A negative pulse applied to the same terminal of the ferroelectric capacitor causes the curve to be traversed from point *a* to point *d* and finally to point *b* when the pulse terminates.

With a ferroelectric capacitor initially in a state *b*, application of a negative pulse causes a shift from point *b* to point *d* and returns when the pulse terminates.

Points *a* and *b* are stable polarization states and information thus represented will remain stored for a considerable period of time. At these spontaneous polarization points there is no net field within the ferroelectric condenser or external to it and the polarization charge is equal and opposite to the surface charge. Consequently, conduction through the dielectric does not alter the state of polarization and the terminals may even be shorted without loss of the stored information.

In determining which one of the two states *a* or *b* at which a capacitor exists or which one of the binary representations "one" or "zero" has been stored, negative pulses are conventionally applied to cause the capacitor to shift from point *a* to point *d* or from point *b* to point *d*. The slope of the hysteresis curve in shifting from these two storage positions to point *d* is different and, as the slope is proportional to the effective capacitance presented by the ferroelectric, the two states may be distinguished by comparison with a fixed value capacitor. The conventional reading or interrogation destroys the stored information, however, as in each instance the capacitor is caused to shift to point *d* and finally to *b* when the negative read-out pulse is terminated.

The essence of the present invention resides in the electromechanical behavior of ferroelectric capacitors as if it is this feature that allows a non-destructive determination of the direction of polarization or binary representation established therein for information storage purposes.

In applying potentials across the terminals of a barium titanate crystal or ceramic element for causing a change in polarization, a change in dimensions is obtained and conversely, when the element is stressed mechanically, a voltage is developed between the terminal surfaces having the polarity determined by the direction of spontaneous polarization.

The individual crystalline structures may be considered as having an axis of preference for their polarization directions as determined by such forces as are established by the ions or atoms of the material forming the crystalline lattice structure and other factors. An electric field of particular direction may alter these forces to such a degree as to reverse the stable polarization direction which may be observed from Fig. 1*a* in changing from state *b* to state *a* or vice versa.

In materials of low crystalline anisotropy these forces are of low relative magnitude and may also be altered by external mechanical forces applied at the surfaces of the crystal to cause a variation in the component of polarization P.

It has been demonstrated that the strain is proportional to the square of the polarization, as described, for example, in an article by M. E. Caspari and W. J. Merz which appears in Physical Review, vol. 80, 1082 (1950). Figure 1*b* illustrates this characteristic with the vertical axis $Z_z$ representing the strain component along the Z direction of the crystal and the horizontal axis representing the degree of polarization P. Spontaneous polarization in one direction is indicated as $P_a$ and in the opposite sense as $P_b$, and it will be observed from the figure that a change in the degree of polarization produces a corresponding change in stress and consequently in the thickness of the crystal. Further, application of mechanical stress may cause either an increase or a decrease in the component of polarization, however, with mechanical stress applied in one direction an increase in the polarization in the direction of its state of spontaneous polarization is obtained while with mechanical stress applied in the other direction a decrease in polarization is obtained from the initial residual state. On removal of the mechanical forces, the polarization will return to point *a* or point *b* as the forces within the crystal are re-established because of the nature of the rectangular material and the binary information is not destroyed.

The circuit illustrated in Figure 2 depicts an adaptation of this basic principle. The storage capacitor is represented as element F1 and the reading capacitor as element $F_2$. A terminal 10 of the capacitor F1 is connected to ground by a lead 11 and the other terminal 12 is connected by a lead 13 to a source of positive or negative write pulses indicated by a block 14. Terminal 12 is also connected to a gate circuit 15 which has an output lead 16. The storage capacitor F1 is maintained in close physical contact with the second capacitor F2, for example by a mechanical mounting arrangement to be later described. Terminal 10 of capacitor F1 and terminal 17 of capacitor F2 are positioned in contact with one another and the latter is also connected by lead 11 to ground. A terminal 18 is coupled to a source of interrogating pulses 19 through a lead 20 and usual coupling capacitor 21. The terminal 18 is normally maintained at a positive potential by connection through line 20 and a resistor 22 to a source of potential 23, the negative terminal of which is grounded. The interrogation pulse is also applied to gate 15 by a lead 24 so as to activate this component at read-out time.

The details of the capacitors F1 and F2 and an arrangement for mounting them in a holder is shown in Figure 3*a* and Figure 3*b*. A conductive coating 25 of aluminum or other metal is applied to each surface of a crystal of barium titanate by evaporation or other suitable processes. The crystals are mounted in a holder shown in Figure 3*b* where they are held between insulating blocks 26 and maintained in contact with one another by pressure exerted by a coil spring 27 which is adjusted by means of a screw 28. The terminals of the capacitors are connected to the circuit leads by spring contacts which are correspondingly labeled.

Again referring to Figure 2, a binary "zero" or "one" is stored in capacitor F1 by polarizing the dielectric with either a positive or negative write pulse $E_1$ from source 14 to cause it to exist stably at either point *b* or point *a* on its hysteresis curve. The capacitor F2 is maintained in a state of polarization *c*, for example, by means of the potential applied to terminal 18 by the steady state voltage source 23. In interrogating the capacitor F1 to determine which one of the binary states is stored, a voltage E2 is applied from the pulse source 19 and the condenser F2 is caused to shift polarization states from point *c* through point *a* to point *d*. The change in dimensions developed in crystal F2 are now applied to condenser F1 and a voltage is developed at terminal 12 which appears as E3 at the output lead 16 of gate 15 which is conditioned to pass the output pulse at this time. With condenser F1 storing a binary "zero" or polarized to point *b*, it is driven toward saturation point *d* by the applied pressure and a voltage −E ideally is developed. If storing a binary "one" or polarized to point *a*, it is driven to saturation point *c* and ideally a voltage of plus E is developed. The polarity of the input pulse, therefore, depends upon the direction of stable polarization of capacitor F1 which in turn depends upon the polarity of the write pulse E1 previously applied. On termination of the interrogation pulse E2, condenser F2 reverts to its former state *c* due to the bias voltage applied from source 23.

It is obvious that the capacitor F2 need not make a complete traversal of its hysteresis loop but that E2 may be less than the voltage of source 23. The magnitude of the output potential E3, however, will depend upon the relative magnitudes of voltages E2 and that of source 23 as well as the efficiencies of the acoustical coupling, the piezoelectric conversion and in the ferroelectric properties of the $BaTiO_3$ used.

It should also be noted that the polarity or phase of the output signal may be reversed by causing a reduction in the pressure applied to the storage condenser F1 and causing the stable polarization state to be changed in a direction away from saturation as well as toward saturation. This may be accomplished by reversing the polarity of the source 19. In each case, however, after termination of the interrogation pulse, the condensers F1 and F2 return to the same dimensions as before the interrogation pulse and the stored information is not destroyed by the read-out operation.

It is further considered that elemental regions of a large ferroelectric crystal may be employed for storage of a plurality of binary representations and each element of such a matrix may be interrogated simultaneously by mechanical pressure applied to the crystal as a whole but sensed at only selective addresses programmed to operate in accordance with a predetermined system activating individual gates 15 such as that shown with the single storage element illustrated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for determining the state of polarization of a ferroelectric storage capacitor comprising means for applying a potential to the terminals of a piezoelectric device rigidly mechanically coupled to said storage capacitor, and means for detecting the polarity of a signal produced at the terminals of the storage capacitor as a result of the mechanical stress developed therein through piezoelectric action of said device.

2. A ferroelectric capacitor capable of selectively assuming one of two stable states of polarization representative of binary information, means for determining the particular stable state of polarization at which said capacitor exists, comprising, means for applying mechanical stress to said capacitor through application of a potential to the terminals of a piezoelectric device rigidly coupled to said capacitor, and means connected to terminals of said ferroelectric capacitor and operable to detect the polarity of a voltage developed in response to said stress.

3. A ferroelectric storage capacitor capable of selectively assuming one of two stable states of polarization representative of binary information, means comprising a second ferroelectric capacitor rigidly mechanically coupled to said storage capacitor, means for applying potentials to terminals of said second capacitor and thereby applying mechanical stress to said storage capacitor by piezoelectric action, and means for detecting the polarity of a signal developed at terminals of said storage capacitor.

4. A memory system comprising a ferroelectric storage capacitor capable of assuming either one of two stable states of polarization as a result of application of potentials to terminals thereof, a piezoelectric device rigidly mechanically coupled to said storage capacitor, means for selectively applying potentials of either polarity to the terminals of said storage capacitor to establish a state of polarization representative of binary information, means for subsequently applying potentials to terminals of said piezoelectric device to thereby apply stress to said ferroelectric storage capacitor, and means for simultaneously sensing a voltage developed at the terminals of said storage capacitor.

5. A memory system comprising a ferroelectric storage capacitor capable of assuming either one of two stable states of polarization as a result of an electric field applied thereto, a piezoelectric device, means for mounting said device and said storage capacitor and maintaining a constant pressure therebetween, means for causing said storage capacitor to attain one of said stable states of polarization, means for subsequently causing said piezoelectric device to vary the pressure exerted on said storage capacitor, and means for sensing the polarity of a voltage developed at the terminals of said ferroelectric capacitor.

6. A memory system comprising a ferroelectric storage capacitor capable of assuming either one of two stable states of polarization as a result of an electric field of one or the other polarities applied thereto, a piezoelectric device comprising a second ferroelectric capacitor, means for mounting said device and said ferroelectric storage capacitor and for maintaining a constant pressure therebetween, means for applying an electric field of selected polarity to the terminals of said storage capacitor to establish one of said stable states of polarization representative of binary information, means applying a constant electric field to said piezoelectric device, means subsequently varying the constant electric field applied to said device to thereby apply mechanical stress to said storage capacitor, and means for simultaneously sensing a voltage developed at the terminals of said storage capacitor, the polarity of said voltage being indicative of the binary representation stored.

7. A memory device comprising a ferroelectric storage capacitor capable of assuming either one of two stable residual states of polarization as a result of an electric field applied thereto, said stable polarization states being representative of binary information, means for sensing the residual polarization state of said ferroelectric capacitor in a non-destructive manner comprising, means for varying the degree of polarization thereof, and further means for sensing the change and direction of said polarization to indicate the binary state thus represented.

8. Apparatus for storing the determining binary information represented by polarization states of a ferroelectric capacitor comprising means for applying an electric field of selected polarity to terminals of a ferroelectric capacitor to represent either one of two binary digits, means for applying a constant electric field to a piezoelectric device mechanically coupled thereto and maintained in contact therewith under fixed pressure, means for varying the electric field applied to said device and means for simultaneously sensing the voltage developed across said ferroelectric capacitor as a result of piezoelectric action therein.

9. Apparatus for determining the state of polarization of a ferroelectric storage capacitor and thereby ascertaining which one of two binary digits is stored comprising means for applying mechanical stress to said storage capacitor through application of a potential to the terminals of a piezoelectric device rigidly coupled to said storage capacitor, and means for detecting the polarity of a signal produced at the terminals of said storage capacitor as a result of the mechanical stress developed therein through piezoelectric action of said device.

References Cited in the file of this patent

UNITED STATES PATENTS

| | | |
|---|---|---|
| 2,073,251 | Myers | Mar. 9, 1937 |
| 2,633,543 | Howatt | Mar. 31, 1953 |
| 2,666,195 | Bachelet | Jan. 12, 1954 |
| 2,695,396 | Anderson | Nov. 23, 1954 |

OTHER REFERENCES

Mellon Institute, Quarterly Report No. 3; pp. (VII–I)–(VII–2) and Figure VII–2, July 11, 1951.

Report R–212, Digital Computer Lab., MIT, Fig. 26, pp. 26–27, June 5, 1952.